US007979202B2

(12) United States Patent
Adamczyk et al.

(10) Patent No.: US 7,979,202 B2
(45) Date of Patent: *Jul. 12, 2011

(54) METHODS, SYSTEMS, AND COMPUTER PROGRAM PRODUCTS FOR IMPLEMENTING A LOCATOR SERVICE

(75) Inventors: Maria Adamczyk, Alpharetta, GA (US); Edward Silver, Atlanta, GA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/501,696

(22) Filed: Jul. 13, 2009

(65) Prior Publication Data

US 2009/0276236 A1 Nov. 5, 2009

Related U.S. Application Data

(63) Continuation of application No. 11/868,585, filed on Oct. 8, 2007, now Pat. No. 7,577,519, which is a continuation of application No. 11/022,442, filed on Dec. 22, 2004, now Pat. No. 7,289,903.

(51) Int. Cl.
*G01C 21/00* (2006.01)
*B60Q 1/48* (2006.01)

(52) U.S. Cl. .................................... 701/207; 340/932.2

(58) Field of Classification Search .......... 701/207-208, 701/213-215, 200-202; 340/988, 991-992, 340/932.2; 280/761; 705/13

See application file for complete search history.

(56) References Cited

U.S. PATENT DOCUMENTS

| | | | | |
|---|---|---|---|---|
| 4,876,540 | A | 10/1989 | Berthon et al. | |
| 5,091,727 | A | 2/1992 | Mahmood | |
| 5,289,369 | A | 2/1994 | Hirshberg | |
| 5,745,052 | A | 4/1998 | Matsuyama et al. | |
| 7,289,903 | B2 | 10/2007 | Adamczyk et al. | |
| 7,577,519 | B2 * | 8/2009 | Adamczyk et al. | 701/207 |
| 2008/0024324 | A1 | 1/2008 | Adamczyk et al. | |

* cited by examiner

*Primary Examiner* — Yonel Beaulieu

(74) *Attorney, Agent, or Firm* — Cantor Colburn LLP

(57) ABSTRACT

Methods, systems, and computer program products for implementing a locator service are provided. A method includes receiving object identification information and location identification information from a vehicle. The location identification information indicates the presence of the vehicle at a parking space. The method also includes creating an occupancy record that includes the object identification information and the location identification information. The method further includes receiving a request to locate the vehicle during an exiting process, the request including at least a portion of the objection identification information. The method further includes retrieving the location identification information from the occupancy record associated with the object identification information, and presenting the location identification information of the parking space to the operator. The location identification information is received at the computer system via a radio frequency identifier associated with the parking space.

20 Claims, 3 Drawing Sheets

METHODS, SYSTEMS, AND COMPUTER PROGRAM PRODUCTS FOR IMPLEMENTING A LOCATOR SERVICE

CROSS REFERENCE TO RELATED APPLICATIONS

This application is a continuation of U.S. patent application Ser. No. 11/868,585, filed Oct. 8, 2007, now U.S. Pat. No. 7,577,519, which is a continuation of U.S. patent application Ser. No. 11/022,442, filed Dec. 22, 2004, now U.S. Pat. No. 7,289,903, the entire contents of which are incorporated herein by reference.

BACKGROUND

Exemplary embodiments relate generally to wireless communications, and more particularly, to methods, systems, and computer program products for implementing a locator service.

Wireless technologies have grown in popularity for a variety of applications. For example, in the personal consumer market, wireless home networking devices provide configurable internetworking solutions for various types of home devices such as communications, computing, and entertainment devices.

On a larger scale, wireless technologies such as global satellite communications offer global positioning services for mobile devices. For example, GPS services provide mapping and direction assistance to travelers. Global positioning services are also utilized to track the location of vehicles in an effort to minimize theft. Another popular market relating to global satellite technology is the satellite radio and programming industry. Many vehicles are now equipped with wireless receivers that pick up satellite music and programming from all over the world (e.g., services provided by XM Satellite Radio, Inc. of Washington, D.C. as well as SIRIUS Satellite Radio of New York City, N.Y.). These types of applications typically involve a subscription service to a service provider.

In addition to personal consumer applications, business applications relating to wireless technologies have also enjoyed great advancements (e.g., wireless area networks, cellular communications for field activities, etc.).

As wireless technologies continue to advance, consumers, business entities, government, military, and other organizations will continue to look for ways to exploit them.

SUMMARY OF THE INVENTION

Exemplary embodiments relate to methods, systems, and computer program products for implementing a locator service. A method includes receiving object identification information and location identification information from a vehicle. The location identification information indicates the presence of the vehicle at a parking space. The method also includes creating an occupancy record that includes the object identification information and the location identification information. The method further includes receiving a request to locate the vehicle during an exiting process, the request including at least a portion of the objection identification information. The method further includes retrieving the location identification information from the occupancy record associated with the object identification information, and presenting the location identification information.

Systems for implementing a locator service include a computer system executing a locator application and a storage device in communication with the computer system. The storage device houses occupancy records generated via the locator application. The locator application implements a method. The method includes receiving object identification information and location identification information from a vehicle. The location identification information indicates the presence of the vehicle at a parking space. The method also includes creating an occupancy record that includes the object identification information and the location identification information. The method further includes receiving a request to locate the vehicle during an exiting process, the request including at least a portion of the objection identification information. The method further includes retrieving the location identification information from the occupancy record associated with the object identification information, and presenting the location identification information.

Computer program products for implementing a locator service include instructions for causing a computer system to implement a method. The method includes receiving object identification information and location identification information from a vehicle. The location identification information indicates the presence of the vehicle at a parking space. The method also includes creating an occupancy record that includes the object identification information and the location identification information. The method further includes receiving a request to locate the vehicle during an exiting process, the request including at least a portion of the objection identification information. The method further includes retrieving the location identification information from the occupancy record associated with the object identification information, and presenting the location identification information.

Other systems, methods, and/or computer program products according to exemplary embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Referring now to the drawings wherein like elements are numbered alike in the several FIGURES.

DETAILED DESCRIPTION OF EXEMPLARY EMBODIMENTS OF THE INVENTION

In accordance with exemplary embodiments, locator services are provided. Locator services provide the ability to detect and track the location of objects via wireless communications systems. The locator services also provide the ability to manage identifying information relating to the object being tracked and may enable service fees to be implemented for the locator service. While described herein with respect to an automobile locator service, it will be understood by those skilled in the art that the functions described with respect to the locator service may be applied to any type of object that is mobile for which tracking services are desired.

Figure 1:
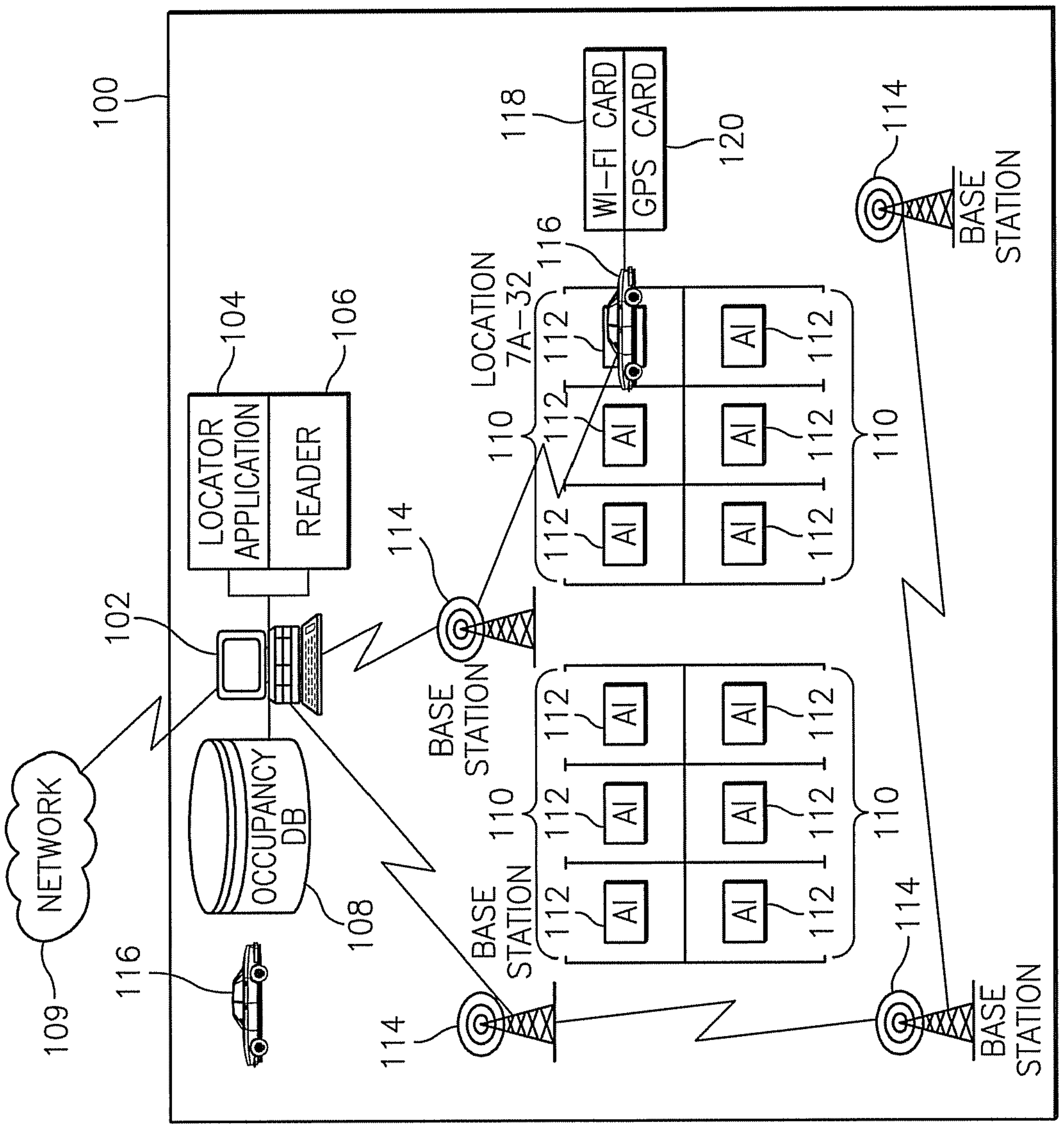
FIG. 1 is a block diagram of an environment in which the locator service system functions may be implemented in exemplary embodiments.

Turning now to FIG. 1, an environment in which the locator service activities may be implemented will now be described. In accordance with exemplary embodiments, the system 100 of FIG. 1 refers to an area, such as a parking area (e.g., garage, lot, etc.). The parking area of system 100 may be, e.g., a parking facility for an amusement park, an office complex, a shopping mall, a sports area, an airport, or other similar type of complex facility that provides substantial parking services to its clientele. The parking area of system 100 may be an indoor, outdoor, or combination of parking facilities and may further provide value-added services such as valet parking. It should be appreciated that the invention is not limited to tracking mobile/portable devices in parking areas but is applicable to tracking occupancy of any type of mobile or portable device within any location.

According to an exemplary embodiment, the entity providing the locator services for parking area of system 100 includes a computer system 102 (processor device) that executes a locator application 104 and a reader 106. The locator services may be managed by a third-party provider system on behalf of the entity managing the parking area 100, which provides the locator services to the parking area entity for a fee. In exemplary embodiments, the locator services are provided directly by the parking area entity of system 100 and, in particular, by the computer system 102. The computer system 102 may handle sending and receiving information to and from other entities in the parking area of system 100 and may perform associated tasks.

In alternative embodiments, the computer system 102 may be in communication with one or more additional computer systems that, together, provide locator service activities over a network 109 to multiple locations (e.g., multiple parking garages owned by a business enterprise in New York City or an airport parking lot providing information regarding location to one or more area hotels). If the locator services are provided jointly by multiple entities, the locator service processing may be shared by their respective computer devices over the network 109 as further described herein.

According to an exemplary embodiment, locator application 104 receives location identification information from mobile or portable objects (e.g., mobile device 116) via, e.g., a wireless fidelity (WiFi) network. While the description that follows refers to mobile devices, in particular vehicles, for illustrative purposes, it will be appreciated that the invention may also be applicable to tracking of other types of portable devices. The WiFi network comprises base stations 114, WiFi card 118, and reader 106. These components are described further herein. The locator application 104 associates location identification information to corresponding mobile object identifiers (identification information) for objects (e.g., 116) that occupy a location 110. The locator application 104 tracks these associations for multiple objects and locations in occupancy records that are stored in storage device 108. The locator application 104 may also include a timing device (e.g., a timestamp function) that tracks occupancy duration and may further provide payment services for an occupancy based upon the duration of the occupancy or other criteria. The functions provided by the locator application 104 are further described in the flow diagram of FIG. 2.

Reader 106 receives transmissions from automatic identifiers 112 via the WiFi network as described further herein. The transmissions comprise a serial number or other identification as described further herein with respect to the automatic identifiers 112. Reader 106 converts the radio waves reflected back from the automatic identifier 112 into digital information that may be used by the locator application 104. The reader 106 may comprise a device that includes signal conditioning, parity error checking, and correction. The reader 106 receives signals from the WiFi network, verifies the signals, and decodes them. An algorithm may also be applied to determine if a signal is a repeat transmission. In this manner, the reader 106 would then send a signal to the appropriate automatic identifier 112 to cease signaling.

In exemplary embodiments, the system 100 shown in FIG. 1 includes a storage device 108. Storage device 108 is in communication with computer system 102 and may be implemented using a variety of devices for storing electronic information. It is understood that the storage device 108 may be implemented using memory contained in the computer system 102 or it may be a separate physical device. If the locator services are provided over a network (e.g., 109), the storage device 108 may be logically addressable as a consolidated data source across a distributed environment that includes the network. Information stored in the storage device 108 may be retrieved and manipulated via the computer system 102. The storage device 108 houses one or more databases of occupancy information. Sample database information is shown and described in FIG. 3.

Network 109 may be any type of known network including, but not limited to, a wide area network (WAN), a local area network (LAN), a global network (e.g. Internet), a virtual private network (VPN), and an intranet. The network 109 may be implemented using a wireless network or any kind of physical network implementation known in the art. The computer system 102 may be connected to the network 109 in, e.g., a wireless fashion.

Locations 110 refer to a defined area or space for which the presence or occupancy of a mobile object is tracked. For illustrative purposes, locations 110 are referred to in this description as parking spaces in a parking area.

Automatic identifiers 112 may comprise a radio frequency identification (RFID) transponder (also referred to as RFID tag) that utilizes radio waves for identifying objects, as one skilled in the art would appreciate. Each of automatic identifiers 112 may include a microchip that stores a serial number or other means of identifying a corresponding location 110. The automatic identifier 112 may also include an antenna attached to the microchip. The antenna enables the microchip to transmit the location identification information to reader 106 and/or mobile object 116.

As shown in FIG. 1, base stations 114 are dispersed throughout the parking area of system 100. Base stations 114 receive and transmit wireless signals between one another as well as between automatic identifiers 112, mobile object 116, and reader 106.

Mobile objects 116 may be, for example, a vehicle such as an automobile, motorcycle, bus, truck, to name a few. For purposes of illustration, the mobile object 116 will be described herein with respect to a WiFi- and GPS-enabled automobile.

According to an exemplary embodiment, mobile object 116, depicted for illustrative purposes in FIG. 1 as an automobile, includes a WiFi card 118 that enables the object 116 to communicate over any type of 802.11 network. The WiFi card 118, base stations 114, and reader 106 are collectively referred to herein as a WiFi network.

Mobile object 116 further includes a GPS card/application 120 that provides tracking and navigation assistance to the operator of automobile 116. The GPS card 120 may comprise a commercial application such as Garmin Quest GPS Navigator™ provided by Garmin International of Olathe, Kans.

Figure 2:
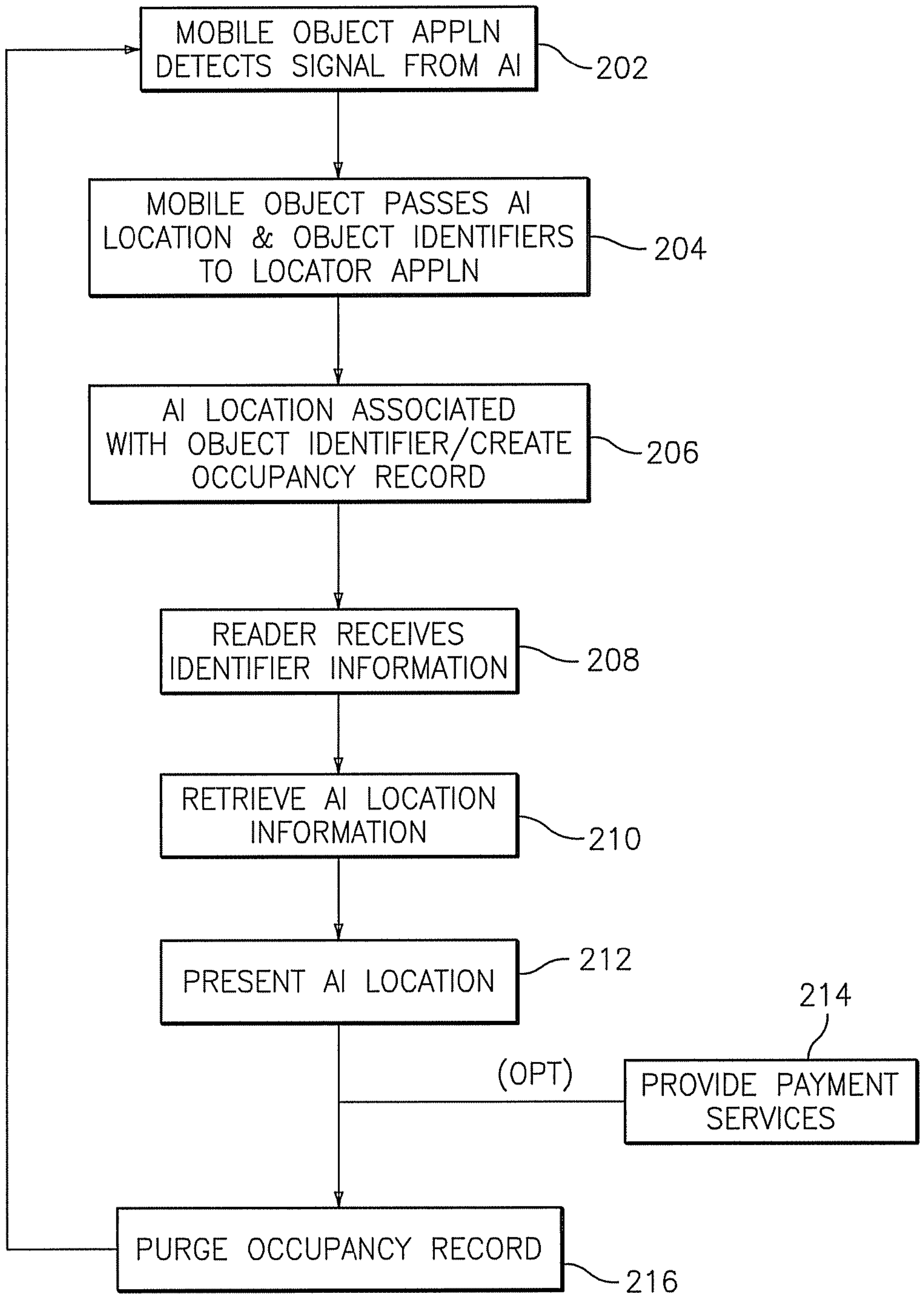
FIG. 2 is a flow diagram of a process for implementing a locator service in exemplary embodiments.

Turning now to FIG. 2, a flow diagram of a process for implementing locator services will now be described with respect to an automobile. As indicated above, the locator services provide the ability to detect and track the location of objects via wireless communications systems. For example, consider a mobile object 116 that enters the parking area of system 100 and parks in one of locations 110. At step 202, GPS application 120 in the mobile object 116 detects a signal being emitted by the automatic identifier 112. The signal emitted provides the identification of the location 110 that has been accessed by the mobile object 116.

At step 204, the mobile object 116 passes the location identification information, as well as the mobile object identifiers, to the reader 106 via the GPS application 120 and the WiFi network. This may be accomplished by transmitting the location identification information and mobile object identifiers to one of base stations 114 which, in turn, passes the signals in a wireless fashion to either another base station 114 (depending upon the distance between mobile object 116 and the reader 106, or directly to the reader 106. The mobile object identifiers may include the name of an operator of the mobile object, an operator identification (e.g., social security number, drivers license number, etc.), a description of the mobile object (e.g., make, model, color, etc.), or any other type of desired indicia. The reader 106 converts the signals received into a digital form that is understood by the locator application 106.

The locator application 104 receives the converted signals and associates the mobile object identifiers with the automatic identifier information (i.e., location identification information) at step 206 and stores the results in occupancy database of storage device 108. A sample database 300 is shown in FIG. 3.

Figure 3:
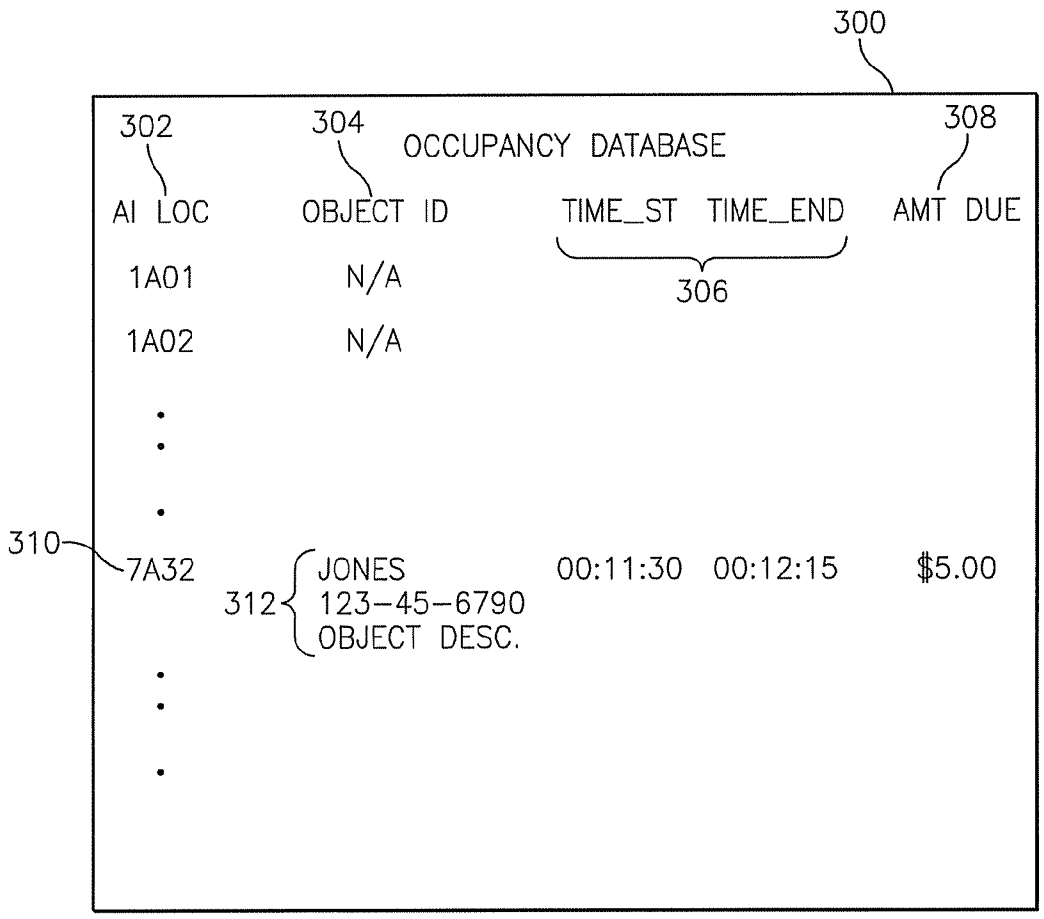
FIG. 3 is a sample database of occupancy records generated via the locator service system in exemplary embodiments.

Database 300 of FIG. 3 includes a record for each of locations 110 as shown in column 302. Database 300 further includes a column 304 for associating the mobile object identifier with a corresponding location 110. If desired, the database 300 may include a column 306 for tracking the duration of time a location 110 is occupied by a mobile device. Column 308 displays any fees charged for the occupation of the location 110. A sample record 310 is shown in database 300 and includes a sampling of mobile object identifiers 312 that may be utilized by the locator application 104, particularly when responding to operator requests to retrieve location information as will be described further herein.

This information is retained in the occupancy database of storage device 108 of FIG. 1 until the operator of the mobile device activates an exit process. At step 208, the operator enters identification information into reader 106 of FIG. 1. The identification information required may include all, or a portion of, the mobile object identifier information transmitted to the locator application 104 in step 204. Utilizing the mobile object identifier information, the locator application 104 retrieves the associated automatic identifier information (i.e., location identification information) from the occupancy database of storage device 108 at step 210. The automatic identification information is presented to the operator at step 212. This information may be displayed to the operator on, e.g., a computer monitor associated with computer device 102, or may be printed out for the operator.

Optionally, any fees that may have accrued may be handled via the locator application 104, if desired, at step 214. For example, the operator may be provided with the option to pay for any parking fees based upon, e.g., the amount of time the mobile device 116 has been parked in the location 110. In further embodiments, the locator application 104 may include a service for preferred customers (e.g., repeat business) or for customers who purchase inclusive packages (e.g., season tickets at an amusement park or ball park include free parking), such that the identifier information transmitted to the locator application 104 may include a special code or flag that distinguishes these types of individuals from the general public. Alternatively, the location 110 itself may be reserved for preferred customers such that the automatic identification information includes a unique code that distinguishes the location's occupant from others (e.g., the first row of each parking section is reserved for preferred customers).

At step 216, the locator application 104 purges the occupancy record from the database of storage device 108 (FIG. 1) indicating that the location 110 is unoccupied. The process returns to step 202 each time a location 110 becomes occupied.

As indicated above, the locator services provide the ability to detect and track the location of objects via wireless communications systems. The locator services also provide the ability to manage identifying information relating to the object being tracked and may enable service fees to be implemented for the locator service.

As described above, embodiments may be in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims.

What is claimed is:

1. A method for implementing a locator service, comprising:

receiving, at a computer system, object identification information and location identification information from a vehicle, the location identification information indicating the presence of the vehicle at a parking space;

creating an occupancy record that includes the object identification information and the location identification information;

receiving a request to locate the vehicle during an exiting process, the request including at least a portion of the objection identification information;

retrieving the location identification information from the occupancy record associated with the object identification information; and presenting the location identification information of the parking space to an operator of the vehicle;

wherein the location identification information is received at the computer system via a radio frequency identifier associated with the parking space, the radio frequency identifier detecting the presence of the vehicle at the parking space.

2. The method of claim 1, wherein the object identification information includes at least one of:

the operator of the vehicle;

an identification associated with the operator; and a description of the vehicle.

3. The method of claim 1, further comprising:

collecting fees from an operator of the vehicle during the exiting process based upon information in the occupancy record.

4. The method of claim 3, wherein collecting fees includes:

tracking, in the occupancy record, an amount of time the vehicle occupies the parking space; and associating the amount of time with an occupancy fee.

5. The method of claim 3, wherein collecting fees comprises:

flagging the object identification information in the occupancy record to distinguish the vehicle, and a service package provided to the operator of the vehicle, from other vehicles; and implementing payment services for the occupancy based upon terms of the service package.

6. The method of claim 1, wherein the location identification information is received at the computer system, over a wireless network, via a global positioning system on the vehicle, the global positioning system receiving the location identification information from the radio frequency identifier.

7. The method of claim 1, further comprising:

assigning a unique code to the location identification information to distinguish the corresponding parking space from other parking spaces; and reserving the parking space having the unique code for preferred customers.

8. A system for implementing a locator service, comprising:

a computer system executing a locator application; and a storage device in communication with the computer system, the storage device housing occupancy records generated via the locator application, the locator application performing:

receiving, at the computer system, object identification information and location identification information from a vehicle, the location identification information indicating the presence of the vehicle at a parking space;

creating an occupancy record that includes the object identification information and the location identification information;

receiving a request to locate the vehicle during an exiting process, the request including at least a portion of the objection identification information;

retrieving the location identification information from the occupancy record associated with the object identification information; and presenting the location identification information of the parking space to an operator of the vehicle;

wherein the location identification information is received at the computer system via a radio frequency identifier associated with the parking space, the radio frequency identifier detecting the presence of the vehicle at the parking space.

9. The system of claim 8, wherein the object identification information includes at least one of:

the operator of the vehicle;

an identification associated with the operator; and a description of the vehicle.

10. The system of claim 8, wherein the locator application further implements:

collecting fees from an operator of the vehicle during the exiting process based upon information in the occupancy record.

11. The system of claim 10, wherein collecting fees includes:

tracking, in the occupancy record, an amount of time the vehicle occupies the parking space; and associating the amount of time with an occupancy fee.

12. The system of claim 10, wherein collecting fees comprises:

flagging the object identification information in the occupancy record to distinguish the vehicle, and a service package provided to the operator of the vehicle, from other vehicles; and implementing payment services for the occupancy based upon terms of the service package.

13. The system of claim 8, wherein the location identification information is received at the computer system, over a wireless network, via a global positioning system on the vehicle, the global positioning system receiving the location identification information from the radio frequency identifier.

14. A computer program product for implementing locator services, the computer program product including a computer-readable storage medium having instructions stored thereon for causing a computer system to implement a method, the comprising:

receiving, at the computer system, object identification information and location identification information from a vehicle, the location identification information indicating the presence of the vehicle at a parking space;

creating an occupancy record that includes the object identification information and the location identification information;

receiving a request to locate the vehicle during an exiting process, the request including at least a portion of the objection identification information;

retrieving the location identification information from the occupancy record associated with the object identification information; and presenting the location identification information of the parking space to an operator of the vehicle;

wherein the location identification information is received at the computer system via a radio frequency identifier associated with the parking space, the radio frequency identifier detecting the presence of the vehicle at the parking space.

15. The computer program product of claim 14, wherein the object identification information includes at least one of:

the operator of the vehicle;

an identification associated with the operator; and a description of the vehicle.

16. The computer program product of claim 14, further comprising instructions for collecting fees from an operator of the vehicle during the exiting process based upon information in the occupancy record.

17. The computer program product of claim 16, wherein collecting fees includes:

tracking, in the occupancy record, an amount of time the vehicle occupies the parking space; and associating the amount of time with an occupancy fee.

18. The computer program product of claim 16, wherein collecting fees comprises:

flagging the object identification information in the occupancy record to distinguish the vehicle, and a service package provided to the operator of the vehicle, from other vehicles; and implementing payment services for the occupancy based upon terms of the service package.

19. The computer program product of claim 14, wherein the location identification information is received at the computer system, over a wireless network, via a global positioning system on the vehicle, the global positioning system receiving the location identification information from the radio frequency identifier.

20. The computer program product of claim 14, further comprising instructions for performing:

assigning a unique code to the location identification information to distinguish the corresponding parking space from other parking spaces; and reserving the parking space having the unique code for preferred customers.

* * * * *